Feb. 28, 1950      M. MALLORY      2,499,071
CONTROL MECHANISM FOR VARIABLE SPEED TRANSMISSIONS
Filed March 29, 1945
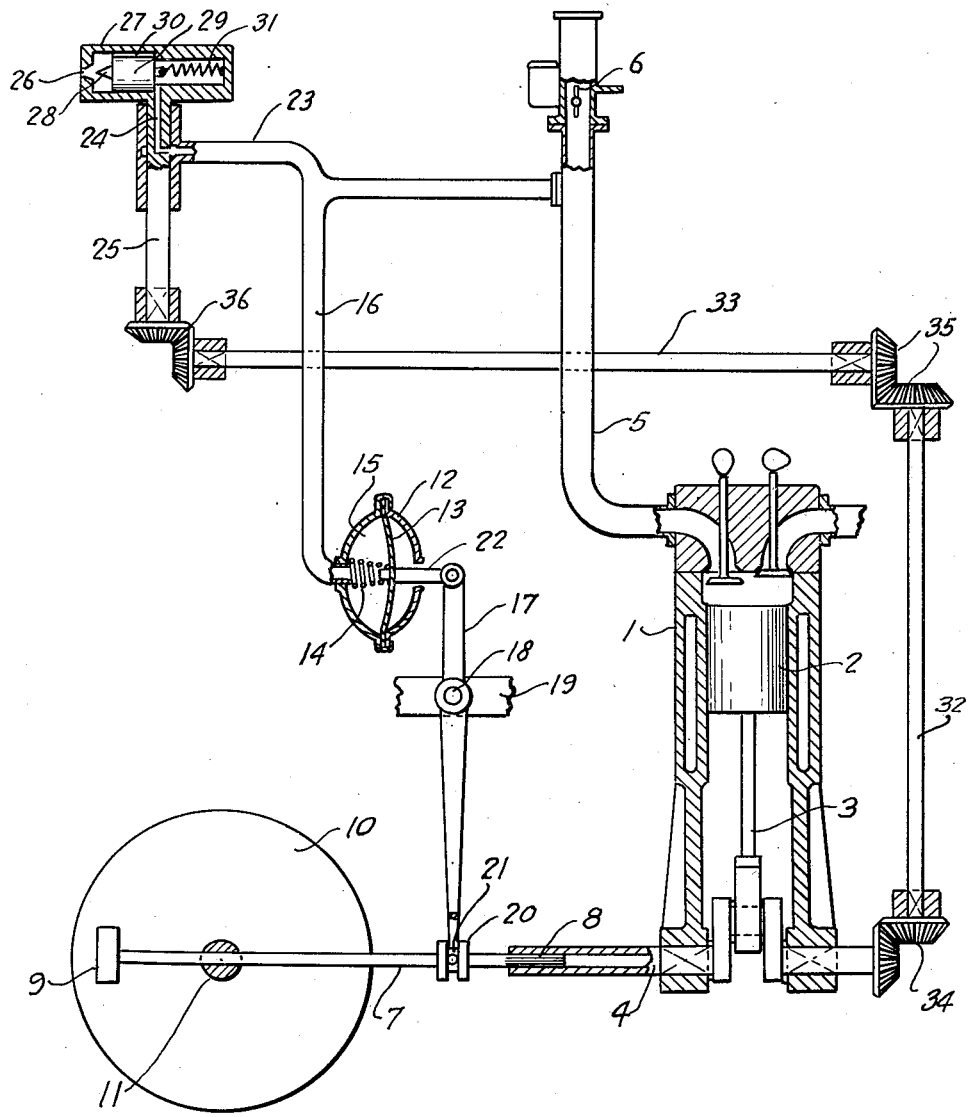
INVENTOR.
Marion Mallory
BY
Barnes, Kisselle, Laughlin & Raisch
Attorneys Patented Feb. 28, 1950

2,499,071

UNITED STATES PATENT OFFICE 2,499,071

CONTROL MECHANISM FOR VARIABLE-SPEED TRANSMISSIONS

Marion Mallory, Detroit, Mich.

Application March 29, 1945, Serial No. 585,548

4 Claims. (Cl. 74—336.5)

This invention relates to a control mechanism for a variable speed transmission for an internal combustion engine.

It is the object of this invention to produce a control mechanism for a variable speed transmission for an internal combustion engine which will automatically vary the driving ratio of the transmission in accordance with the load on the engine.

My invention also contemplates a change speed control mechanism for an internal combustion engine which is of simple structure, reliable and efficient in operation, and economical to produce.

In the operation of an internal combustion engine the vacuum in the intake manifold increases as the load on the engine decreases and the vacuum in the intake manifold decreases as the load on the engine is increased. Therefore, the engine should have a greater leverage or a lower driving ratio or speed over the unit it is driving when more load is placed on the unit and the engine should have less leverage or a higher driving ratio or speed over the unit it is driving when the load placed on the unit is decreased. My change speed control mechanism accomplishes this result.

The drawing illustrates my change speed driving mechanism for an internal combustion engine.

The elements illustrated in the drawings are referenced as follows: internal combustion engine 1, reciprocating piston 2, connecting rod 3, engine driving shaft 4, engine intake passageway 5, throttle valve 6, stub shaft 7 splined in driving shaft 4 as at 8, driving pulley 9, driven wheel 10 fixed on driven shaft 11, servo-motor 12 comprising flexible diaphragm 13, compression spring 14, suction chamber 15; conduit 16 connecting suction chamber 15 with intake passageway 5, lever 17, pivot 18 for lever 17 on the fixed support 19, collar 20 fixed on shaft 7, yoke 21 on the free end of lever 17 interengaging collar 20, connecting rod 22 pivoted on shaft 17 and fixed to diaphragm 13, air bleed conduit 23 connected into conduit 16 and communicating with passageway 24 in shaft 25, air bleed orifice 26 in valve housing 27 fixed on shaft 25, valve 28 on piston 29, by-passageway 30 in piston 29, tension spring 31 tending to hold centrifugally unbalanced valve 28 open, drive shafts 32 and 33 and beveled gear sets 34, 35 and 36 for driving shaft 25 off of the engine crankshaft 4.

The operation of my device is as follows: Assume that driven wheel 10 and driven shaft 11 are driving anything, such, for example, as the wheels of an automotive vehicle, a saw-mill, or a corn grinder. While engine 1 runs, pulley 9, which is of friction material, drives wheel 10. The engine, as shown, is operating under full load or wide open throttle. At lower engine speeds it is desirable to operate the transmission in low gear, that is, at a lower driving ratio between driving pulley 9 and driven wheel 10 to avoid roughness. Therefore, at lower engine speeds, I arrange centrifugal valve 28 so that it will be open and air bleed the servo-motor 12. Since centrifugally balanced valve 28 is open, air bleeds into suction chamber 15 through orifice 26, passageways 30, 24 and conduits 23, 16.

Since the pressure in chamber 15 is substantially atmospheric, spring 14, acting through lever 17, has shifted stub shaft 7 and pulley 9 to the left thereby effecting a low driving ratio between pulley 9 and driven shaft 11. As the engine picks up speed, valve 28 will close and the vacuum in the intake passageway will build up a vacuum in chamber 15 thereby causing flexible diaphragm 13 to move toward the left against compression spring 14 and swing lever 17 counter-clockwise, which moves pulley 9 to the right thereby increasing the driving ratio between driving shaft 7 and driven shaft 11, that is, as pulley 9 moves toward shaft 11 the leverage of the engine over driven shaft 11 is decreased and it will take fewer revolutions of pulley 9 to effect each revolution of wheel 10.

In the event throttle 6 is moved toward an open position, the vacuum will decrease in chamber 15 causing lever 17 to move to the right, which moves pulley 9 outwardly on the wheel 10 and changes the gear ratio so that the engine has greater leverage over the unit it is driving when the vacuum is decreased in the intake manifold.

In the event the load of the engine is decreased by moving throttle 6 toward a closed position, the vacuum will increase, causing lever 17 to move to the left and pulley 9 to move to the right on wheel 10. This changes the gear ratio between the engine and the unit it is driving so the engine has less leverage over the driven unit, and of course the engine makes less revolutions per revolution of wheel 10 when the vacuum is high in the manifold or the engine is operating under light load than it does when the vacuum is low in the manifold and the engine is operating under heavier load.

It is, of course, understood that pulley 9 and wheel 10 are shown merely for illustrative purposes and not by way of limitation. Obviously, any of the well known change speed transmissions can be substituted for the change speed transmission exemplified by pulley 9 and wheel 10.

I claim:

1. A transmission control for an internal combustion engine having an intake passageway, comprising a driving shaft, a driven shaft, variable ratio transmission mechanism between said driving and driven shafts, a servo-motor connected to said variable ratio drive transmission mechanism, a passageway connecting said servo-motor with said intake passageway whereby said servo-motor responds to changes in intake passageway pressure to actuate said variable ratio transmission mechanism and vary the driving ratio between the driving and driven shafts, a centrifugally controlled air bleed valve mechanism actuated in accordance with the speed of the engine and arranged to bleed air into the servo-motor when the engine is operating below a predetermined speed whereby the servo-motor maintains a low driving ratio between the driven and driving shafts.

2. A change speed transmission control for an internal combustion engine having an intake passageway and a throttle valve for controlling the flow of motive fluid through said passageway, comprising a driving shaft, a driven shaft, a change speed transmission between said driving and driven shafts, pressure actuated means having an operative connection with said change speed transmission, a conduit connecting said pressure actuated means with the intake passageway on the engine side of said throttle valve whereby as the vacuum rises in the intake passageway, such as occurs when the speed of the engine increases or the throttle valve is moved toward closed position and said below mentioned fluid bleed is closed, the pressure actuated means responds to said increase in vacuum to change the speed of the transmission to a higher driving speed and thereby decrease the leverage of the driving shaft over the driven shaft, a fluid bleed for said pressure actuated means, means actuated in accordance with the speed of the engine for controlling said fluid bleed, said last mentioned means being arranged to open said fluid bleed below a predetermined engine speed to thereby bleed down the vacuum in said pressure actuated means whereby the pressure actuated means at such low engine speeds responds to said decrease in vacuum to change the speed of the transmission to a lower driving speed and thereby increase the leverage of the driving shaft over the driven shaft.

3. A transmission control for an internal combustion engine having an intake passageway comprising a driving shaft, a driven shaft, variable ratio transmission mechanism between said driving and driven shafts, a servo-motor connected to said variable ratio drive transmission mechanism, a passageway connecting said servo-motor with said intake passageway whereby said servo-motor responds to changes in intake passageway pressure to actuate said variable ratio transmission mechanism and vary the driving ratio between the driving and driven shafts, an air bleed orifice for bleeding air into said servo-motor, and a centrifugal valve actuated in accordance with the speed of the engine for controlling said air bleed orifice, said centrifugal valve closing said air bleed orifice when the engine is operating above a predetermined speed whereby the servo-motor maintains a high driving ratio between the driven and driving shafts, said centrifugal valve opening said air bleed orifice when the engine is operating below said predetermined speed whereby the servo-motor responds to lower the driving ratio between the driven and driving shafts.

4. The combination as set forth in claim 2 wherein the fluid bleed for said pressure actuated means bleeds to atmosphere and wherein the means for controlling said fluid bleed comprises a centrifugally unbalanced valve rotated in accordance with the speed of the engine and arranged to close said air bleed when the engine is operating above a predetermined speed.

MARION MALLORY.

REFERENCES CITED

The following references are of record in the file of this patent:

UNITED STATES PATENTS

| Number | Name | Date |
|---|---|---|
| 1,783,931 | Tenney et al. | Dec. 2, 1930 |
| 1,993,544 | Fleischel | Mar. 5, 1935 |
| 2,094,418 | Swanson | Sept. 28, 1937 |
| 2,362,655 | Mallory | Nov. 14, 1944 |